United States Patent [19]

Criswell

[11] Patent Number: 5,077,739
[45] Date of Patent: Dec. 31, 1991

[54] METHOD FOR ISOLATING FAILURES OF CLEAR SIGNALS IN INSTRUCTION PROCESSORS

[75] Inventor: Peter B. Criswell, Bethel, Minn.

[73] Assignee: Unisys Corporation, Blue Bell, Pa.

[21] Appl. No.: 353,307

[22] Filed: May 17, 1989

[51] Int. Cl.$^5$ .............................................. G06F 11/00
[52] U.S. Cl. ..................................... 371/16.1; 371/3; 371/15.1; 371/16.5; 371/68.1
[58] Field of Search ................ 371/16.1, 3, 68.1, 15.1, 371/16.5, 68.3

[56] References Cited

U.S. PATENT DOCUMENTS

| | | | |
|---|---|---|---|
| 4,081,662 | 3/1978 | Pehrson et al. | 235/308 |
| 4,144,448 | 3/1979 | Pisciotta et al. | 235/301 |
| 4,373,201 | 2/1983 | Bohan, Jr. | 371/68.1 |
| 4,392,226 | 7/1983 | Cook | 371/61 |
| 4,507,784 | 3/1985 | Procter | 371/3 |
| 4,683,570 | 7/1987 | Bedard et al. | 371/36 |
| 4,701,845 | 10/1987 | Andreason et al. | 364/200 |
| 4,811,343 | 3/1989 | Johansson et al. | 371/61 |
| 4,842,509 | 9/1985 | Buchanan et al. | 371/61 |
| 4,864,574 | 9/1989 | Pritt | 371/61 |
| 4,903,270 | 2/1990 | Johnson et al. | 371/3 |
| 4,920,540 | 4/1990 | Baty | 371/47.1 |
| 4,924,467 | 5/1990 | Criswell | 371/68.1 |
| 4,943,969 | 7/1990 | Criswell | 371/68.1 |
| 4,945,512 | 7/1990 | Dekarske et al. | 371/10.2 |

Primary Examiner—Jerry Smith
Assistant Examiner—Ly V. Hua
Attorney, Agent, or Firm—Glenn W. Bowen; Mark T. Starr

[57] ABSTRACT

An instruction processor for a data processing system runs arithmetic sequences that are initiated by sequence designator signals and are interrupted by interrupt signals. During operation of the processor logic elements of the processor are selectively cleared by clear signals during time periods that sequence designator signals are in inactive states following the occurrence of an interrupt signal. Dual indentical logic circuits are employed wherein each of the circuits include error circuit elements that are coupled to receive the interrupt signal and arithmetic sequence initiation signals. A comparator is coupled to an output of each of the dual identical logic circuit to receive signals that are used to indicate when an interrupt signal and an arithmetic sequence initiation signal occurs simultaneously in only one of the logic circuits. Clear sequence circuitry in each of the dual identical logic circuits receives the interrupt signal and selectively supplies clear signals to the logic elements.

17 Claims, 5 Drawing Sheets

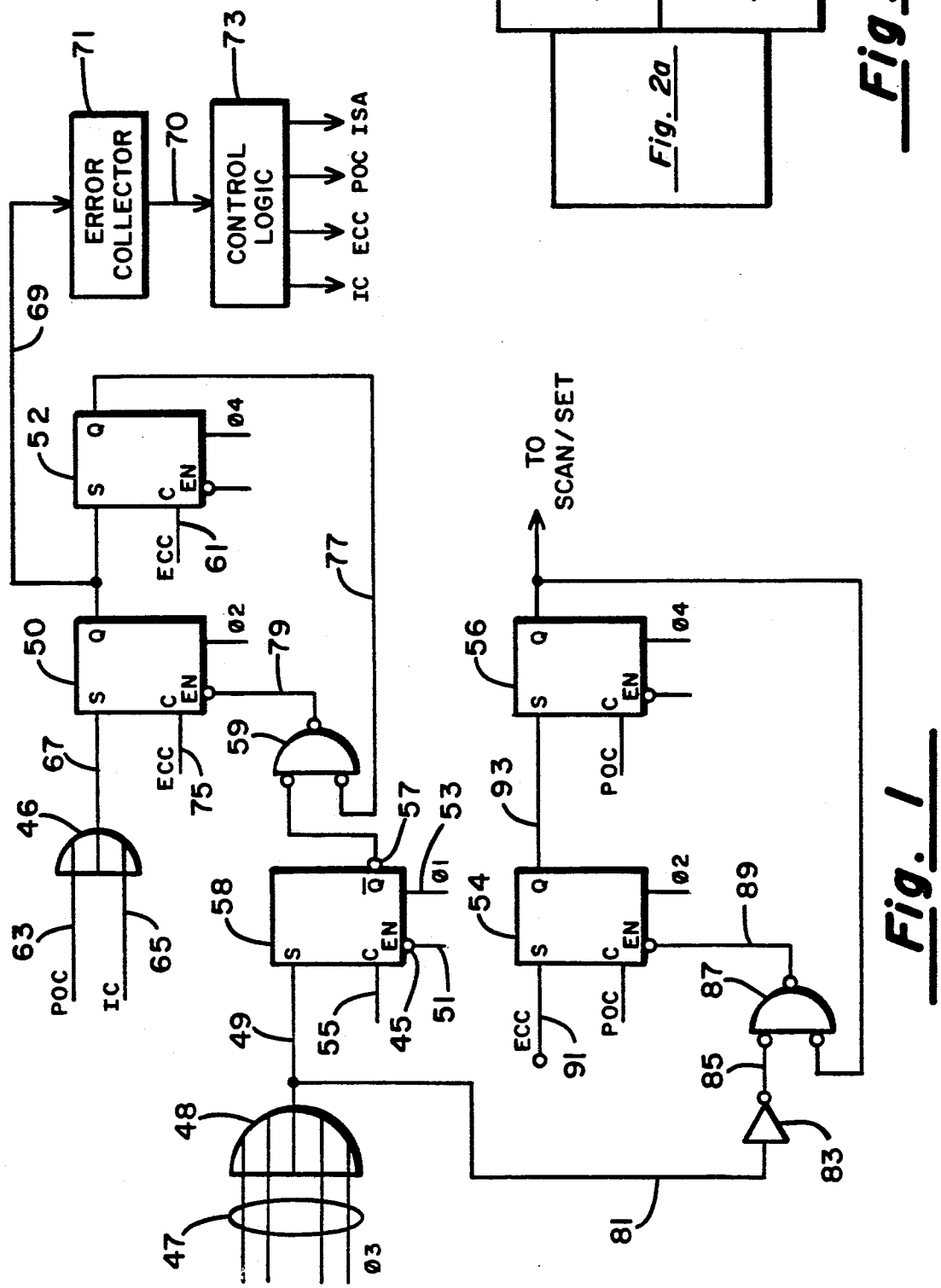

METHOD FOR ISOLATING FAILURES OF CLEAR SIGNALS IN INSTRUCTION PROCESSORS

FIELD OF THE INVENTION

This invention is in the field of fault isolation for data processing systems and, more particularly, for the isolation of clear signal faults in instruction processors.

DISCUSSION OF THE BACKGROUND OF THE INVENTION

Fault isolation for large electronic modules, such as an arithmetic section of an instruction processor, is most effective if it can be done with a FTO (First Time Occurrence) analysis. Such an analysis is generally based on data capture in the hardware at the time of the error. The effectiveness of FTO analysis is dependent on the error detection coverage and quantity of data captured.

When clear signals fail, they can greatly restrict the usefulness of error capturing mechanisms. This is especially troublesome in an environment where a software analysis routine automatically attempts to interpret the captured data, which can be greatly distorted from what should have been captured due to the failing clear signals. Failure of clear signals can result in large numbers of registers and latches being cleared within an electronic unit, including compare and capture registers. Without a method of detecting whether any clear signals have failed, the driver module for these signals would always have to be considered as a possible source of the failure, and this leads to needless swapping of modules in an attempt to fix the problem.

A method of detecting errors for clear signals is therefore highly desirable. Such faults can be immediately identified as being involved with clear signals. The absence of the detection of a clear signal error eliminates the driver modules from consideration and adds credibility to any values captured in compare and capture registers when other faults occur.

SUMMARY OF THE INVENTION

An instruction processor for a data processing system is provided in which arithmetic sequences are initiated by sequence designator signal when the sequence designation signals are in an active state. Logic elements of said processor are, during proper operation, cleared by clear signals during time periods that said sequence designator signals are in inactive states following the occurrence of an interrupt signal. Clear logic control circuitry receives the interrupt signal and supplies the clear signals to the logic elements. Dual identical logic circuits each includes error circuitry and each of which is coupled to receive the interrupt signal and an arithmetic sequence designator signal which are coupled to a common comparator through a single output terminal of each logic circuit. The comparator indicates the simultaneous presence of an interrupt signal and an arithmetic sequence designator signal in only one of said dual identical logic circuits which thereby indicates if an error has occurred in only one of the dual identical logic circuits.

The instruction processor is used to detect a clear fault and delivers an error signal in the clear logic control circuitry which generates a power-on clear signal and an error clear signal. A scan-set test system is utilized along with an error collector means that receives the fault signal. A first latch is included which receives the error clear signal as a latch setting signal and the power-on clear signal as a latch clearing signal. A second latch receives the power-on clear signal as a latch setting signal, and the error clear signal as a latch clearing signal. The output of said second latch is coupled to the error collector means and the error collector means provides an error signal in response thereto when a power-on clear signal occurs at a time that it should not occur. The first latch is coupled to provide an input to the test system.

BRIEF DESCRIPTION OF THE DRAWINGS

The present invention is described with reference to the drawings in which:

FIG. 1 is a block diagram of one embodiment of the invention,

FIG. 2 represents the placement of FIGS. 2a, 2b and 2c relative to each other to illustrate another embodiment.

TECHNICAL DESCRIPTION OF THE INVENTION

Figure 2A:
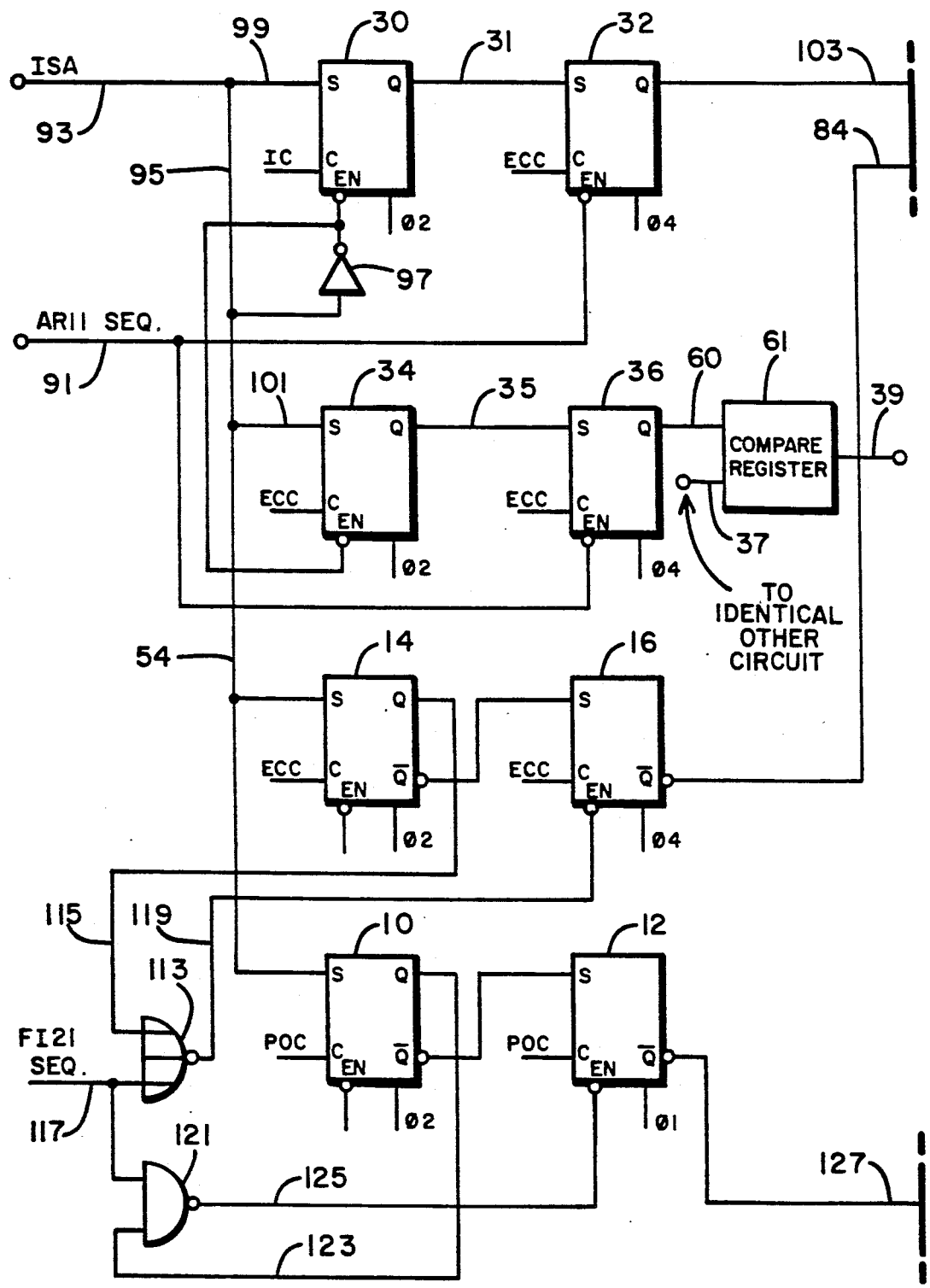
FIGS. 2a, 2b and 2c represent a partial block diagram of the alternate embodiment.

This invention relates in particular to the detection of errors in the clear signal logic and distribution in which several detectors are used to check relationships between the various clear signals that are employed in an electronic module. In the described embodiment there are four levels of clear signals with the following purposes and relationships:

Power On Clear (POC). This is the highest order clear used in the described embodiment. It is used to clear all latches that are cleared by the other clears, plus some that are unique to Power On Clear. It cannot be issued while the clocks are running.

Interrupt Clear (IC). This is the lowest order clear signal employed in the described embodiment. It can be issued while the clocks are running as part of the interrupt handling sequencing.

Error Capture Clear (ECC). This signal is used to clear the error detecting and capturing logic. It can be issued while the clocks are running as part of the interrupt handling sequencing following the detection of a hardware fault. If an ECC signal is issued an IC signal is also issued at the same time.

In addition to these three clears, the following two signals relate to the clear operations and may be used in checking the clear signals:

Interrupt Sequence Abort (ISA). This signal is issued by the interrupt handling logic and is used to stop the sequencing of other sections of the data processing system. This signal is always issued several cycles before an IC or an ECC is broadcast, so that the rest of the machine is halted and stable before the clears are activated.

After an ISA signal is activated, an IC signal must be issued before the arithmetic section can be restarted. An ECC signal could be also issued at the same time as the IC signal.

Error Capture Disable (ECD). This is a signal that is generated in the interrupt handling logic to disable the error detectors while an IC or ECC is active. It always becomes active prior to the IC or ECC clear and remains active until after the clear drops.

This invention is intended for use in an instruction processor that has a multiphase clock (in particular, a four phase clock). One embodiment for an instruction processor that is under the control of sequence designators, which are signals which go to an active level when a sequence is being run in the instruction processor, is shown in FIG. 1. Sequence designation signals are supplied on the lines 47 to the OR gate 48. A sequence designator signal will be low or cleared after an interrupt abort signal has been generated in the IP, or whenever that sequence has been completed, or is inoperative. The sequence designator signals on the lines 47 are provided from latches (not shown) that are set on clock phase 3.

The illustrated embodiments utilize latches that are D-type, flip-flops which have external D.C. reset or clear terminals. These flip-flops are called single rail devices since only a set input line is utilized in conjunction with a clock signal to control the setting and clearing of the latch. The clear input is unconditional since it does not require a clock. The output of the latch otherwise follows the input level that is present on the set or S input upon the occurrence of the clock phase that is coupled to the latch. The following Table I relates latches shown in FIGS. 1, 2a, 2b and 2c and relates particular error conditions to clear signals which can cause those errors.

TABLE 1

| Latch | Error Condition | Clear Signals Which Can Cause Error |
|---|---|---|
| 50 | A POC or IC was issued while an arithmetic sequence was active and the clocks were running | POC IC ISA |
| 54 | An ECC was issued while an arithmetic sequence was active and the clocks were running | ECC ISA |
| 32 | No IC was received after an ISA before the AR section was restarted | IC ISA |
| 105, 107 109, 28 | A POC was issued while the clocks were active | POC |
| 24 | An IC was issued with the clocks running and no ECD surrounding it | IC ECD |
| 22 | An IC or ECD signal was active before an ISA was issued | IC ECD ISA |
| 18 | An ECC signal was active before an ISA was issued | ECC ISA |
| 36 | No ECC was received after an ISA before the AR section was restarted. This is not an error condition itself, but the corresponding latches can be compared when dual modules are involved to detect an error | ECC |

The output of the OR gate 48 of FIG. 1 is coupled on the line 49 to the set (S) input terminal of the latch 58. The latch 58 has its enable (EN) terminal permanently enabled by leaving the line 51 open since the latches of the described embodiment are enabled when a low signal is applied to the enable terminal. The latch 58 is clocked by phase 1 on the clock line 53. The D.C., or unclocked, clear signal for the latch 58 that is provided on the line 55 is the ECC signal. The ECC signal is also initially supplied to the latch 58 upon power-on so that the latch 58 will be initially triggered to its clear state. If any of the input sequence designator signals are at a high (i.e., active) level on the lines 47, the output of the OR gate 48 will be at a high level and the latch 58 will be set upon the occurrence of a clock phase 1 signal.

This results in a low level signal being supplied to the NAND gate 59 from the $\overline{Q}$ or clear output of the latch 58. The other input of the NAND gate 59 is also enabled via the set or Q output terminal of the latch 52. This other input to the NAND gate 59 is, therefore, at an initial low level signal since it is derived from the set (Q) output of the latch 52. The gate 59, therefore, is open to enable the latch 50 until the latch 52 is set whenever any sequence designator is at a high level.

The OR gate 46 receives the power-on clear (POC) and the interrupt clear (IC) signals on its input lines 63, 65, respectively. The output of the OR gate 46 is supplied on the line 67 to the set input terminal of the latch 50. Therefore, if either a POC or IC signal appear while the gate 59 is enabled, the latch 50 will be set. This means that if any of the sequence designators are high, or in active state, when either a POC or an IC signal occurs, the latch 50, which is clocked by a phase 2 clock, will be set since it will be enabled via NAND gate 59. When the latch 50 is set it provides an error signal on the line 69 to the error collector 71. The error collector 71 is coupled to the control logic 73 which supplies the IC, ECC, POC and ISA signals. The latch 50 is D.C. cleared by an ECC signal on the line 75. Following the setting of the latch 50 on phase 2 time, the Q, or set, output from the latch 50 will be supplied to the latch 52, and the latch 52 will be set on the phase 4 time. When the latch 52 is set, its Q output signal is supplied on the line 77 back to the input of the NAND gate 59 at a high level, and NAND gate 59 is then no longer able to provide an enabling signal for the latch 50 so the latch 50 remains locked in its set state despite the state of the latch 58.

The output of the OR gate 48 is also supplied on the line 81 to the inverter 83 the inverted output of which is coupled on the line 85 to one input of the NAND gate 87. The other input of the NAND gate 87 is supplied from the set, or Q, output terminal of the latch 56, so that when the latch 56 is set the NAND gate 87 can no longer enable the latch 54. The output of the latch 56 is also utilized in a scan/set test network. The set input of the latch 54 is coupled to the line 91 to receive the ECC signal. This latch is initially cleared by POC by the clear (C) input terminal of the latch 54 and otherwise follows the ECC signal at clock 2 phase time as long as the gate 87 is open. The latch 54 is clocked on a phase 2 clock, and the Q output of the latch 54 is coupled to the S input of the latch 56 on the line 93. Thus the latch 54 supplies an indication of the occurrence of an ECC signal during the time that any sequence designator signal is also high, or active.

In the described embodiment of FIG. 1, the latch 54 does not have an error output line to the error collector 71 as does the latch 50. Latches 50, 52 and 58 are all cleared by an ECC signal, while the latches 54, 56 are cleared by a POC signal. Although upon initialization an ECC signal must be supplied to the latches 50, 52 and 58, they will not be thereafter cleared by another ECC until one is supplied by the control logic 73 upon command by the error collector 71, which occurs after a hardware fault has been detected and handled in the error collector 71. Upon the setting of the latch 52, such subsequent error due to the occurrence of a POC or IC signal during an active sequence of the IP will, therefore, be detected only after the ECC signal has issued a D.C. clear signal to the latches 50, 52. The latch 50 is also cleared by the ECC to initialize it to its clear state.

The manner in which an error is determined by setting of the latches 54 and 56 in the preferred embodiment is that these are included in a scan-set test system 45 which may utilize any one of a number of commonly known scan-set techniques and configurations in order to determine that the latch 54 has been set by the erroneous appearance of an ECC signal during the time that a sequence designator was active. Latches which are not cleared by ECC or IC signals cannot be tied into the error detection and reporting mechanism, or into comparison registers, when dual identical circuit cards are utilized because they cannot be cleared during a normal interrupt handling sequence which issues only ECC and IC signals following a hardware fault detection. The latches 54 and 56 once set will remain set until a new POC signal is generated upon restart of the device, or until the scan-set system generates a POC.

Figure 2B:
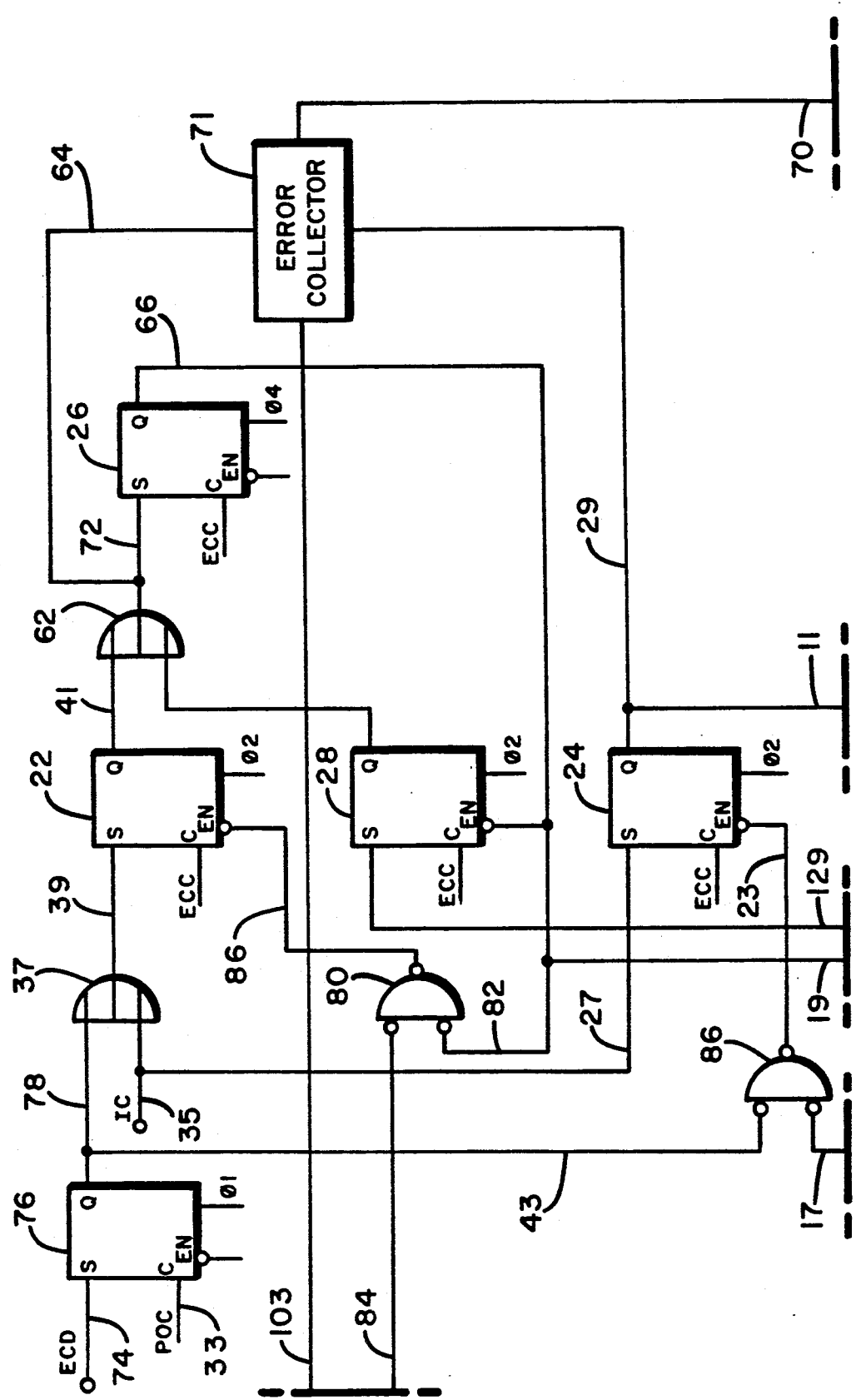
Figure 2C:
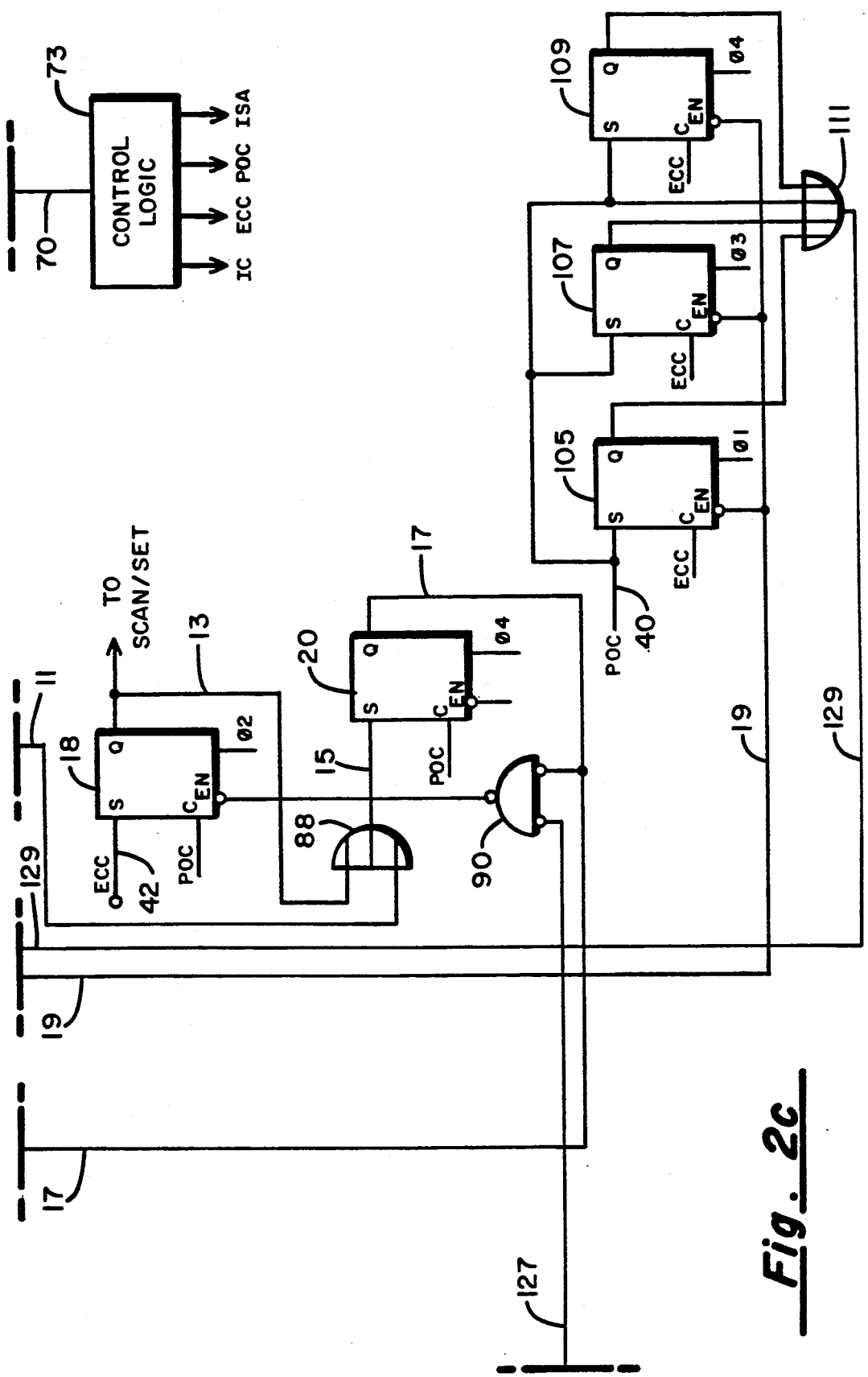
Figure 3:
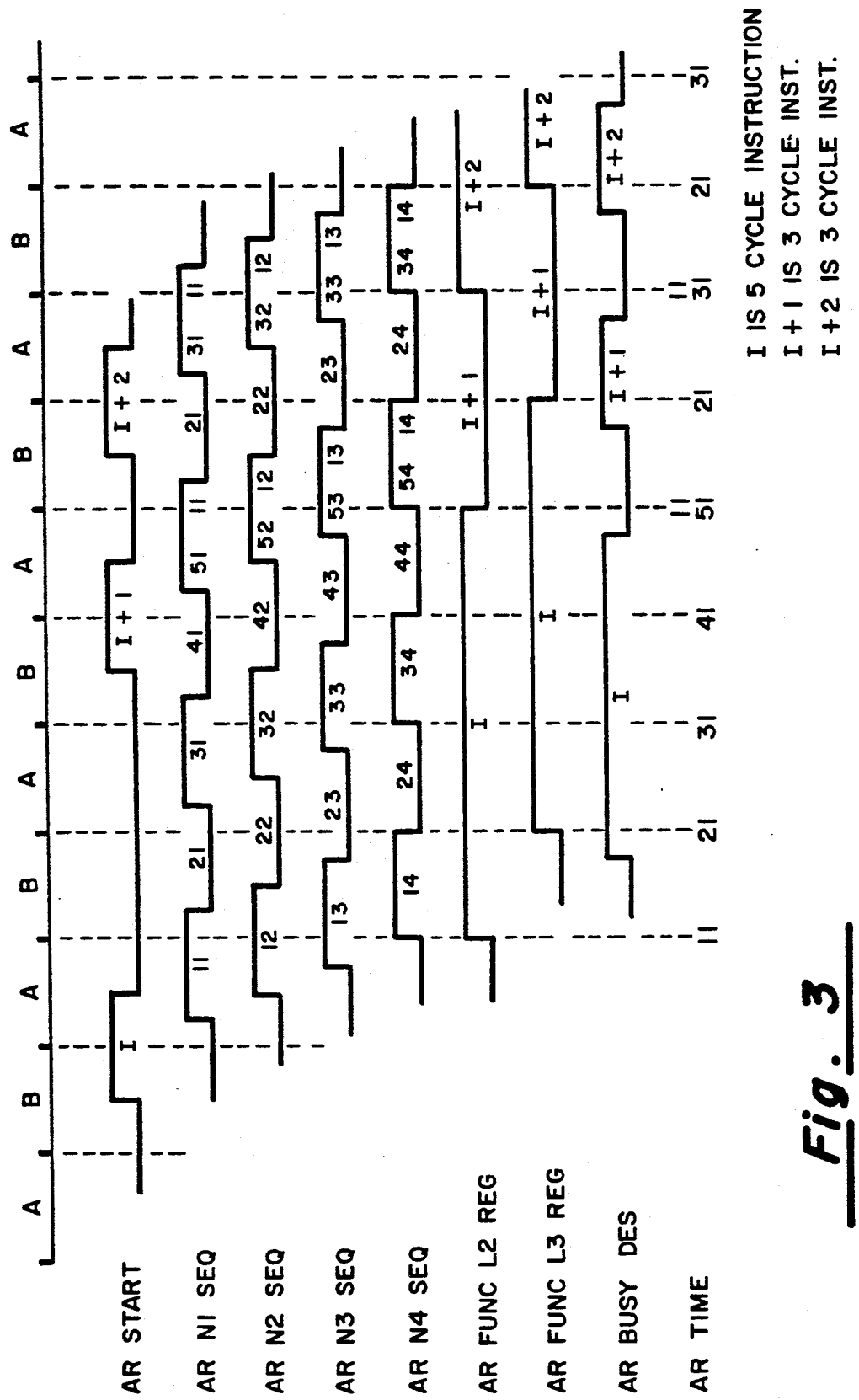
FIG. 3 is a timing diagram for the embodiment.

In the alternate embodiment of FIGS. 2a, 2b and 2c, the sequence designators are not run through a common gate to initiate clear error checking. Instead, the timing sequence of the instruction processor is utilized to detect when IC, ECC or POC clears may occur during time periods they are not supposed to be present. In this embodiment two additional signals are employed, the interrupt sequence abort (ISA) signal and the error capture disable (ECD) signal. When arithmetic sequences are run in the instruction processor, the first sequence initiated is the AR 11 SEQ signal. The AR indicates an arithmetic sequence and the 11 designation indicates that it is a clock cycle 1, phase 1 sequence. In the system of the described embodiment of FIG. 2, odd and even cycles and four clock phases per cycle are implemented. By definition, AR 11 Time, or arithmetic time 11, follows the AR 11 Sequence designation by three clock phases. Other AR XX times also follow their same AR XX SEQ signals by three clock phases (e.g., AR 21 Time follows AR 21 SEQ signals by three clock phases). Therefore, the AR 11 Sequence signal goes from a low to a high level on phase 2, the associated AR 11 Time occurs three phases later, or at the beginning of the next clock cycle (i.e., concurrent with an AR 14 SEQ signal), as shown in FIG. 3.

When the AR 11 Sequence signal goes high, it provides enabling input signals via the line 91 to the enabling input of the latches 32 and 36. The latches 32 and 36 are both D.C. cleared by the ECC signal and are clocked on a phase 4 signal. The ISA or instruction sequence abort signal is issued to stop the sequencing of other sections of the data processing system during interrupt handling. This signal occurs several cycles before an IC or ECC signal is transmitted. The ISA signal should not occur during the time that an arithmetic sequence is active following an AR 11 Sequence signal on the line 91, unless it is followed by an IC or ECC clear.

The ISA signal is supplied via the lines 93, 95 and the inverter 97 to the enabling inputs of the latches 30 and 34. The latch 34 is cleared by the ECC signal while the latch 30 is cleared by the IC signal. Both of the latches 30 and 34 are clocked on phase 2 time. Therefore, both of the latches 30 and 34 will be set on a clock phase 2 signal when an ISA signal occurs because the ISA signal is coupled both to the set input lines 99 and 101, and also to the enabling terminals of the latches 30, 34. Note that an alternate implementation would be to tie high signals to the set inputs of latches 30 and 34 and would avoid a possible race condition problem between the dropping of the enable and data inputting.

The outputs of the latches 30, 34 are respectively coupled on the lines 31, 35 to the set inputs of the latches 32, 36. An error output signal will appear on the line 103 if the latch 32 is set by a clock phase 4 signal when the AR 11 sequence is active (i.e., the arithmetic section has been restarted) following the occurrence of the ISA signal and if latch 30 was not cleared by IC. This will occur only in the event that an IC signal did not occur between the time that the ISA signal was received and the time the AR section was restarted. The output of the latch 32 is coupled on the line 103 to the error collector 71, which indicates that an ISA signal was issued and was not followed by an IC or ECC signal in an appropriate time period.

An ECC signal is initiated by the control logic 73 upon command from the error collector 71 on the line 70 after an error has been detected and captured in the error collector 71. The latches 34, 36 have the same connections as the latches 30, 32, except that the latch 34 is cleared by the ECC signal instead of an IC signal, as is latch 32. The latches 34, 36 are desirably employed in instances where dual identical circuit cards are utilized for redundancy and to check when an ISA signal is detected by only one of the circuit modules. The output line 60 from the latch 36 is run to a compare register 61 which receives a similar input line 37 from another identical dual circuit and indicates on line 39 if an ISA signal has been detected by only one of the dual circuit modules. An ECC signal is intended to be issued by the error collector 71 only if a "class 1" error has occurred, which indicates a hardware fault. If only one of the dual circuits receives an ISA signal followed by an AR 11 SEQ signal, then the common comparison register will indicate that an error has occurred in only one of the dual circuits. If both of the modules had received an ISA signal due to a permanent hardware fault, then the latches 34, 36 of both of the modules would have been set.

In instruction processors and other types of data processing circuitry, problems concerning race conditions often must be resolved. In an instruction processor which incorporates the embodiment of FIG. 2, the ECD signal is provided to disable the error detector circuitry while the EC or ECC clears are being issued to prevent gating errors due to race conditions. The ECD signal is active before either the IC or the ECC became active, and it remains active until both the IC and the ECC signals are deactivated, and thus the ECD signals "surrounds" both the IC and the ECC signals in time. The ECD signal is supplied on the line 74 to the latch 76. The latch 76 is clocked on phase 1 and is permanently enabled due to the unconnected enable terminal. The D.C. clearing signal for latch 76 is the POC signal. The latch 76 follows the state of the ECD signal on clock phase 1 time.

The output of the latch 76 is supplied on the line 78 to the OR gate 37. Another input for the OR gate 37 is supplied by the IC signal on the line 35. The IC signal on the line 35 is also supplied via line 27 to the set input of the latch 24. The Q output of the latch 24 is supplied on the line 29 to the error collector 71. Setting of the latch 24 determines when an IC signal was present when an ECD signal was not. This is accomplished by supplying the output of the set latch 76 on the line 43 to one input of the NAND gate 86. The other input of the NAND gate 86 is enabled as long as the latch 20 is not set. With the NAND gate 86 open, the latch 24 is enabled when the IC signal on the line 27 is high. If during this time the ECD signal is low so the latch 76 is not set, the latch 24 can be set. Thus, if the IC signal appears during a time an ECD signal is not present, the gate 86 supplies an enabling signal on the line 27 to set the latch 24 to indicate this error.

Latches 105, 107 and 109 are supplied a POC signal on their input terminals via line 40. Line 40 also is supplied to the set input of latch 28 via line 40 and the OR gate 14. These latches are enabled as long as the latch 26 has not been set since the latch 26 has its Q, or set, output fed back through the line 66 to the enable inputs of these latches and to the enable input of latch 20. The Q output of the latch 26 is also coupled on the line 82 to one input of the NAND gate 80. The NAND gate 80 is coupled on the line 86 to the enable input of the latch 22. The other input to the NAND gate 80 is coupled on the line 84 from the inverted $\overline{Q}$ output of the latch 16. Enabling of the latch 22 allows the latch to be set whenever a signal appears on the line 39, which occurs during the time that either an ECD or an IC signal is high and NAND gate 80 is enabled.

Returning to latches 28, 105, 107, 109, when a POC signal occurs one or more of these latches will set if the clocks are active. Four latches are employed to increase the chances of detecting a "runt" pulse on the POC signal. The latches 105, 107, 109 all have their Q outputs coupled to an OR gate 111 to the set input of the latch 28 along with the POC signal from line 40. The Q output of the latch 28 is coupled to the OR gate 62. The latch 28 is clocked by a phase 2 clock, the latch 105 by a phase 1 clock, the latch 107 by a phase 3 clock and the latch 109 by a phase 4 clock. The manner in which latches 28, 105, 107 and 109 are connected allows these latches to detect when POC has occurred and one of more clock phase signals were being generated at the time. Setting of latch 28 indicates this error. Latch 26 can then be set and latch 28 will be locked-out and can no longer be triggered due to the feedback of the Q output of the latch 26 through the line 66.

The Q output of the latch 28 is also coupled to the line 64 to the error collector 71 through the OR gate 62 to indicate the error. The latch 26 will also be set, as indicated above, if the Q output from a set latch 22 is supplied which indicates that either an ECD signal occurred or an IC signal occurred during a time neither of them should have occurred. The latch 26 is, therefore, set whenever a POC signal occurs while the clocks are running, or an ECD or IC signal occurs at an inappropriate time. The inappropriate time is between the appearance of a second cycle of an arithmetic sequence or an AR 21 Sequence signal and an ISA signal. This time period is monitored by the latches 14, 16. Latch 14 is clocked by clock phase 2, while the latch 16 is clocked by clock phase 1. The input line 54 to the set input of latch 14 receives the ISA signal. Therefore, when an ISA signal has been issued, it first sets latch 14, and then upon the next phase 1 clock it will clear latch 16. Latch 16 is set previously at 21 time by the signal FI 21 SEQ on the line 117. This means that the latch 22 is enabled only during the time period between the 21 time and when an ISA signal is generated. There should be no IC or ECD signals during this time, and if either of these signals occurs latch 22 detects this error.

Detection of the ECC signal occurring prior to the generation of an ISA signal is detected by the latch 18. This latch is enabled through the NAND gate 90, which has an input from the line 127 from the $\overline{Q}$ output of the latch 12 and one on the line 17. The latches 10 and 12 operate in a manner similar to the latches 14 and 16, and are utilized to control the NAND gate 90 so that the latch 18 detects the appearance of an ECC signal before an ISA signal occurs. Latches 12, 16 are enabled through NOR gates 121 and 113, respectively, via lines 125, 119 upon the appearance of the AR 21 SEQ signal, or arithmetic cycle 2 phase 1 on line 117. These gates provide the controls for enabling latches 12, 16 to open the NAND gates 86, 90 at the proper times. Latches 10, 12 use POC clear signals while latches 14, 16 use ECC clear signals.

The latch 20 is utilized to lock out the latch 18 once the latch 20 is set by disabling the gate 90. The set input for the latch 20 on the line 15 can be acquired either from the output of the latch 24 on the line 11 or from the output of the latch 18 on the line 13, through the OR gate 88. Since the latches 18, 20 are cleared by POC clear, they do not supply an output to the error collector. The output of the latch 18 may also be used in the scan/set network. As was previously mentioned, these latches are intended to be incorporated into a scan/set error detection scheme. The latch 18 detects the occurrence of an ECC signal between the time the AR 21 Sequence signal becomes active until an ISA signal is issued.

What is claimed is:

1. In an instruction processor for a data processing system in which arithmetic sequences are initiated by arithmetic sequence designator signals when said arithmetic sequence designation signals are in an active state and logic elements of said processor are, during proper operation, cleared by clear signals during time periods that said arithmetic sequence designator signals are in inactive states following the occurrence of an interrupt signal, the improvement wherein said processor comprises, comparison means for comparing input signals supplied thereof, and dual identical logic circuits coupled to supply input signals to said comparison means, each of which circuits is coupled to receive said interrupt signals and said arithmetic sequence designator signals as inputs and is constructed to provide an input signal to said comparison means that indicates the simultaneous receipt of said interrupt signals and said arithmetic sequence designator signals at its respective inputs wherein said comparison means is constructed to provide an error output signal when only one of said dual logic circuit supplies an input signal to said comparison means that indicates that it has simultaneously received said interrupt signals and said arithmetic sequence designator signals.

2. In an instruction processor comprising logic elements the improvement comprising clear signal generating means for generating and supplying power-on clear signals and error clear signals to said logic elements, error collector means coupled to said clear signal generating means, latch means coupled to receive said power-on clear signal as a latch setting signal and said error clear signal as a latch clearing signal, wherein the output of said latch means is coupled as an input to said error collector means and said error collector means provides an output signal in response to the output of said latch means, and wherein said output signal from said error collector means is coupled to said clear signal generating means for activating the generation of said error clear signals when a power-on clear signal occurs at a time that it should not occur.

3. In an instruction processor as claimed in claim 2 wherein said instruction processor utilizes arithmetic sequence designator signals the further improvement comprising means coupled to receive said power-on clear and said arithmetic sequence designator signals for indicating an error condition when said power-on clear signal occurs during the time at least one of said arithmetic sequence designator signals also occurs.

4. In an instruction processor as claimed in claim 2 wherein said instruction processor utilizes interrupt clear signals and arithmetic sequence designator signals the further improvement comprising means coupled to receive said interrupt clear signals and said arithmetic sequence designator signals for indicating an error condition when said interrupt clear signal occurs during the time at least one of said arithmetic sequence designator signals also occurs.

5. In an instruction processor as claimed in claim 2 wherein said instruction processor utilizes interrupt clear signals the further improvement comprising disable latch means coupled to receive said interrupt clear signals and signal means for generating error capture disable signals that begin in time before and extend in time after each of said interrupt clear signals, wherein said error capture disable signals are coupled to said disable latch means, and said disable latch means indicates an error condition whenever either an error capture disable signal or an interrupt clear signal occurs in the absence of the other signal.

6. In an instruction processor as claimed in claim 2 the further improvement comprising scan-set test means and second latch means coupled to receive said error clear signal as a latch setting signal and said power-on clear signal as a latch clearing signal and having its output coupled to said scan-set test means.

7. In an instruction processor as claimed in claim 6 wherein said instruction processor utilizes arithmetic sequence designator signals the further improvement comprising means coupled to receive said power-on clear and said arithmetic sequence designator signals for indicating an error condition said power-on clear signal occurs during the time at least one of said arithmetic sequence designator signals also occurs.

8. In an instruction processor as claimed in claim 7 wherein said instruction processor utilizes interrupt clear signals and arithmetic sequence designator signals the further improvement comprising means coupled to receive said interrupt clear signals and said arithmetic sequence designator signals for indicating an error condition when said interrupt clear signal occurs during the time at least one of said arithmetic sequence designator signals also occurs.

9. In an instruction processor as claimed in claim 8 wherein said instruction processor utilizes interrupt clear signals the further improvement comprising disable latch means coupled to receive said interrupt clear signals and signal means for generating error capture disable signals that begin in time before and extend in time after each of said interrupt clear signals, wherein said error capture-disable signals are coupled to said disable latch means, and said disable latch means indicates an error condition whenever either an error capture disable signal or an interrupt clear signal occurs in the absence of the other signal.

10. In an instruction processor comprising logic elements as claimed in claim 1, the improvement comprising clear signal generating means for generating and supplying power-on clear signals and error clear signals to said logic elements, error collector means coupled to said clear signal generating means, latch means coupled to receive said power-on clear signal as a latch setting signal and said error clear signal as a latch clearing signal, wherein the output of said latch means is coupled as an input to said error collector means and said error collector means provides an output signal in response to the output of said latch means, and wherein said output signal from said error collector means is coupled to said clear signal generating means for activating the generation of said error clear signals when a power-on clear signal occurs at a time that it should not occur.

11. In an instruction processor as claimed in claim 10 the further improvement comprising means coupled to receive said power-on clear and said arithmetic sequence designator signals for indicating an error condition when said power-on clear signal occurs during the time at least one of said arithmetic sequence designator signals also occurs.

12. In an instruction processor as claimed in claim 10 wherein said instruction processor utilizes interrupt clear signals the further improvement comprising means coupled to receive said interrupt clear signals and said arithmetic sequence designator signals for indicating an error condition when said interrupt clear signal occurs during the time at least one of said arithmetic sequence designator signals also occurs.

13. In an instruction processor as claimed in claim 12 wherein said instruction processor utilizes interrupt clear signals the further improvement comprising disable latch means coupled to receive said interrupt clear signals and signal means for generating error capture disable signals that begin in time before and extend in time after each of said interrupt clear signals, wherein said error capture disable signals are coupled to said disable latch means, and said disable latch means indicates an error condition whenever either an error capture disable signal or an interrupt clear signal occurs in the absence of the other signal.

14. In an instruction processor as claimed in claim 10 the further improvement comprising scan-set test means and second latch means coupled to receive said error clear signal as a latch setting signal and said power-on clear signal as a latch clearing signal and having its output coupled to said scan-set test means.

15. In an instruction processor as claimed in claim 14 the further improvement comprising means coupled to receive said power-on clear and said arithmetic sequence designator signals for indicating an error condition when said power-on clear signal occurs during the time at least one of said arithmetic sequence designator signals also occurs.

16. In an instruction processor as claimed in claim 15 wherein said instruction processor utilizes interrupt clear signals the further improvement comprising means coupled to receive said interrupt clear signals and said arithmetic sequence designator signals for indicating an error condition when said interrupt clear signal occurs during the time at least one of said arithmetic sequence designator signals also occurs.

17. In an instruction processor as claimed in claim 16 wherein said instruction processor utilizes interrupt clear signals the further improvement comprising disable latch means coupled to receive said interrupt clear signals and signals means for generating error capture disable signals that begin in time before and extend in time after each of said interrupt clear signals, wherein said error capture disable signals are coupled to said disable latch means, and said disable latch means indicates an error condition whenever either an error capture disable signal or an interrupt clear signal occurs in the absence of the other signal.

* * * * *